United States Patent
Brown et al.

(10) Patent No.: US 6,747,995 B1
(45) Date of Patent: Jun. 8, 2004

(54) SYSTEM FOR MULTIPLE VOICE LINES WITH DATA OVER A SINGLE SUBSCRIBER LOOP

(75) Inventors: Randall L. Brown, Phoenix, AZ (US); John Wesley Spenik, Phoenix, AZ (US); Thomas J. Buege, Phoenix, AZ (US); Christopher A. Pawlowski, Phoenix, AZ (US); Keith M. McDonald, Glendale, AZ (US); James Hoff, Scottsdale, AZ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/398,697

(22) Filed: Sep. 20, 1999

Related U.S. Application Data

(60) Provisional application No. 60/101,135, filed on Sep. 21, 1998.

(51) Int. Cl.[7] .............................. H04J 3/06; H04J 1/02; H04L 12/66; H04M 11/00

(52) U.S. Cl. ..................... 370/493; 370/350; 370/494; 370/352; 370/419; 379/93.01; 379/93.07

(58) Field of Search .................. 370/352, 351, 370/353, 354, 356, 359, 419, 420, 503, 509, 510, 493, 494; 379/92.04, 93.01, 93.09, 93.31, 100.16, 93.07, 90.01, 91.02

(56) References Cited

U.S. PATENT DOCUMENTS

| | | | |
|---|---|---|---|
| 4,771,425 A | | 9/1988 | Baran et al. |
| 5,214,650 A | | 5/1993 | Renner et al. |
| 5,473,613 A | | 12/1995 | Bliven |
| 5,625,677 A | | 4/1997 | Feiertag et al. |
| 5,684,825 A | | 11/1997 | Ko |
| 5,742,596 A | * | 4/1998 | Baratz et al. ............... 370/356 |
| 5,768,350 A | | 6/1998 | Venkatakrishnan |
| 6,118,777 A | * | 9/2000 | Sylvain ...................... 370/351 |
| 6,259,708 B1 | * | 7/2001 | Cheng et al. ................ 370/493 |
| 6,349,096 B1 | * | 2/2002 | Liu et al. .................... 370/352 |
| 6,370,149 B1 | * | 4/2002 | Gorman et al. .............. 370/419 |
| 6,519,250 B1 | * | 2/2003 | Fan ............................ 370/352 |

* cited by examiner

*Primary Examiner*—Hanh Nguyen
(74) *Attorney, Agent, or Firm*—David J. Zwick; Steven R. Santema

(57) ABSTRACT

A system that provides additional voice lines with data over a single two-wire subscriber loop. At the subscriber premise, one or more telephone instruments and data devices are connected to a digital modem into either a voice or a data interface. Analog voice signals are PCM sampled then packetized, and voice and data packets are transmitted to a CO modem over the subscriber loop. The CO modem depacketizes the voice packets into PCM format and transmits PCM voice information to a CO switch over a standard digital trunk interface. Data packets are routed to a data network. Voice packets are given transmission priority over data packets to ensures that voice is transported in the presence of data with low latency.

18 Claims, 8 Drawing Sheets

SYSTEM FOR MULTIPLE VOICE LINES WITH DATA OVER A SINGLE SUBSCRIBER LOOP

RELATED APPLICATION

This application claims the benefit of U.S. Provisional Application No. 60/101,135, filed Sep. 21, 1998.

FIELD OF THE INVENTION

The present invention relates to digital subscriber loop applications, and more particularly to multiple voice lines with data over a single shared subscriber loop.

BACKGROUND OF THE INVENTION

With the popularity of the Internet and the increasing trend of small businesses locating to the home, telephone service providers are experiencing a large and increasing demand for additional voice line service to businesses and homes.

Most central offices (COs) have excess switching capacity for providing additional voice lines to subscribers. Once an additional access line is extended to a subscriber, there is little expense involved in providing voice services and the added line can provide the telephone service provider with incremental revenue generating services.

The conventional approach for providing additional access voice lines to the subscriber is to add analog subscriber loops by laying additional copper lines to, and changing or adding lightning protection devices at, the subscriber premise. The subscriber loop is the two-wire copper transmission and signaling path between a telephone subscriber's terminal equipment and the serving central office or another piece of terminal equipment. However, the time and expense involved in this approach can be considerable, greatly increasing the time to recoup a return on investment.

A problem with any analog subscriber loop based signaling system, from a transmission perspective, is loss and impairment of the signal. This can be caused by physical conditions, such as bridge taps, gauge changes, line length, insulation, age, and environmental cable damage, or due to interference from external sources such as impulse noise and cross talk. Signal degradation typically manifests as noise, loss, distortion, and interference.

Another problem with the conventional approach is that analog loops are typically used with standard modems which use baseband POTS (Plain Old Telephone Service) voice frequency spectrum (0–4 kHz) to transmit information, and cannot exceed transmission power levels as dictated by the FCC due to cable pair crosstalk effects. The effect of the current FCC rules is to restrict the output of service providers' modems to download speeds of 53 kbps and upload speeds of 31.2 kbps. Actual speeds may vary depending on line conditions, but cannot exceed these maximums.

Frequency Division Multiplexing (FDM) is one technique for providing additional voice lines over a subscriber loop that does not require laying additional copper lines. This approach uses a frequency spectrum that is spectrally isolated from that used by baseband POTS, thus allowing additional 4 kHz analog POTS channels on higher frequency carrier signals to use the same two-wire subscriber loop. Such passband analog carrier techniques tend to amplify the loss and impairments analog loops typically suffer.

A technique that uses FDM is Digital Added Main Line (DAML). At the CO, a DAML modem is presented with two or more subscriber loop analog voice signals. These analog voice signals are converted by the modem to a digital line code format and transmitted over a single subscriber loop to another DAML modem located at or near the customer premise. The customer premise DAML modem decodes the line and presents the subscriber with two or more two-wire connections corresponding to the subscriber loop connections to the DAML modem at the CO. The digital line codes can take a number of forms, the most common of which are Amplitude, Phase and Frequency Shift Keying, 2-Binary-1-Quaternary, Carrierless Amplitude Phase Modulation, and Quadrature Amplitude Phase Modulation. A problem with this approach is that the D/A/D conversion at the CO of the pulse code modulation (PCM) digital signal to an analog loop signal back to the DAML digital signal can cause degradation of the signal through such effects as quantization errors and phase distortion.

Another technique used to transport multiple voice lines in a digital fashion over the subscriber loop is Integrated Services Digital Network (ISDN). This is a direct digital, multiple voice/data channel system that also includes a signaling channel. However, ISDN requires changes in equipment, administration and maintenance at the switching system.

Another approach involves transmitting voice packets over a data network which can include subscriber loops. The better known implementations of this approach are Voice Over IP (VOIP), Voice Over ATM (VOATM), and Voice Over Frame Relay (VOFR).

VOIP applications are typically deployed throughout a campus environment, using CAT 5 wiring or fiber as described in standards publication EIA/TIA-570-91, "Residential and Light Commercial Telecommunications Wiring," Electronic Industries Alliance/ Telecommunications Industry Association, June 1991, to each terminal and connected through a common switching fabric such as Ethernet, ATM or a hybrid system. In addition, calls can bridge to the Internet from the campus environment, or Intranet, via gateways such as routers or Layer 3 switching systems.

In some applications, a desktop computer or other device acts as the VOIP enabled terminal used to support remote communications consistent with ITU-T standards publication H.323, "Packet Based Multimedia Communications Systems," International Telecommunications Union (ITU), Feb 1998. Such systems, typically employ Digital Signal Processors (DSPs) to provide compression of voice IP packets at the desktop which are then forwarded to other stations on the local Intranet or on through the Internet to remote stations. VOATM and VOFR are other packet techniques used to transport voice and interwork3 with the Public Switched Telephone Network (PSTN).

Subscriber loops can extend the reach of a WAN network for VOIP applications using xDSL signaling and transmission techniques. xDSL technologies enable bandwidth to the premise that may co-exist with baseband POTS service. ISDN can also provide bandwidth to the home that connects to a packet network through which it provides voice services. IP packets, ATM Cells, or other frame formats can be transported over subscriber loops using ISDN or xDSL technologies such as ADSL and HDSL.

However, voice and data have different requirements for network services. Voice transmission requires only a small amount of bandwidth, but that bandwidth must be available on a dedicated or continuous basis with very little delay, delay variation, or loss. Even delays in the millisecond range can give rise to noticeable echoes or gaps in the conversation. For example, delays introduced by routers and gateways can have adverse affects on voice.

Packetized speech belongs to the category of realtime data traffic, and as such has stringent delivery requirements with respect to loss and error. In packetized speech, the end-to-end average network delivery time must be small, and the end-to-end variation of the delivery time, including losses, must be small.

In voice transmission, the overall delay should not exceed 200 ms, which is the delay that has been accepted as commercially acceptable. 100–200 ms is the typical goal. At around 800 ms, the delay impedes normal telephonic conversation. Normally, a delay of 200–800 ms is conditionally acceptable for a short portion of the conversation when such occurrences are rare and far apart.

In traditional voice networks, the round trip delay is about 20–30 ms. Voice delays in frame relay networks, can be around 125–200 ms. In Ethernet networks carrying TCP/IP packets, the delay can vary widely depending on traffic loads. Due to the inherent realtime deficiencies of shared data networking technologies, the above issues represent serious challenges for the transmission of voice over typical campus networking environments extended to the premise.

In addition, ATM as a standard still lacks support for voice compression, silence suppression, idle channel cell suppression and signaling support including translation of voice signaling to switched virtual connection ATM signaling.

Further, ATM trunking for narrowband services, such as voice, introduces some additional delay to that encountered naturally over an ATM network due to buffering to accommodate cell delay variation introduced by the ATM network and cell assembly/disassembly delay.

Accordingly, it is an object of the present invention to provide a system that provides additional voice and data lines over a subscriber loop that is shared with POTS.

Another object of the present invention is to provide such a system such that any in-band signaling in support of advanced telephony features is supported.

Another object of the present invention is to provide such a system such that there is no discernible degradation of the reconstructed voice signal.

Another object of the present invention is to provide such a system such that voice traffic has priority over data traffic.

Another object of the present invention is to provide such a system such that the analog modem transmission speed of the line is not capped at the FCC mandated limit of 53.3 kbps for analog lines.

Another object of the present invention is to provide such a system that avoids impairments associated with extra D/A conversions.

Another object of the present invention is to provide such a system using less expensive components commonly found in the data network environment.

Another object of the present invention is to provide such a system that is customer installable at the customer's premise.

Another object of the present invention is to provide such a system that can be incrementally implemented in the network to initially provide voice services without the need to establish a separate data transport infrastructure apart from the current CO switch.

SUMMARY OF THE INVENTION

The present invention is a system that provides additional voice lines over a single two-wire subscriber loop while retaining POTS service to the customer premise over the loop. The system includes a digital modem at the CO connected over the subscriber loop to another digital modem at the customer premise. The CO modem connects to the PSTN over a direct digital interface to the CO switch. This eliminates the extra D/A conversion found in most prior art systems. These D/A conversions are a key source of signal degradation, and the elimination of even one such conversion will provide for an improved signal over the prior art systems. The CO modem can also connect to a data network over a packet interface, such as Ethernet.

The CO modem receives voice data from the CO switch over the digital trunk interface in PCM format clocked to the network timing reference signal. The PCM voice samples are then packetized by the CO modem and transmitted to the customer premise modem using a suitable digital modulation line code. A table mapping digital trunk interface timeslots to telephone line addresses on the customer premise modem is maintained in the CO modem. A timing reference signal synchronized with the network timing reference signal is also transmitted from the CO modem to the customer premise modem. In the upstream direction, PCM sample voice packets are received from the customer premise modem, are depacketized and presented to the CO switch in PCM format clocked to the network timing reference signal over the digital trunk interface.

At the customer premise, one or more telecommunication devices are connected to the digital modem into a voice interface. These telecommunication devices can include telephone instruments, such as traditional telephones, "smart phones," analog modems, or facsimile (FAX) machines.

PCM sample voice packets transmitted from the CO modem are received by the customer premise modem, converted to analog voice band signals using the timing reference signal as a clock, and transmitted to the addressed telephone instrument. In the upstream direction, analog voice band signals from the telephone instruments are converted to PCM samples using the timing reference signal as a clock, packetized into voice packets and transmitted by the customer premise modem to the CO modem over the subscriber loop using the digital modulation line code.

At the customer premise, data devices can be connected to the customer premise modem over a data interface. The data devices can be any source of data packets, for example a computer, bridge, router, or hub, behind which a number of individual computers can reside. Data packets received by the customer premise modem from the CO modem are routed to the addressed data device. In the upstream direction, data packets generated by data devices are transmitted over the subscriber loop using the digital modulation line code to the CO modem.

In this system, the only non-digital transmission stage in the architecture is the analog loop at the subscriber premise connecting the telecommunication devices to the premise modem. This distance is typically only a few feet. This digital architecture greatly reduces the loss and impairments found in conventional systems resulting from the analog path between the telephone instrument and the CO switch.

In the present invention, both voice and data packets are transmitted over the subscriber loop to the CO. However, a key object of the invention is preserving the intelligibility of voice communications. This is accomplished by differentiating between voice and data at both the CO and premise modem, via voice and data interfaces, and using a packet transmission priority scheme that gives voice packets a higher priority than data packets. U.S. Pat. No. 5,692,035 to O'Mahoney et al., and "A Quality of Service Architecture" by Campbell, Coulson, Hutchison, Computer Communication Review, Vol. 24, No. 2, April 1994, describe examples of such packet based systems giving transmission priority to certain packet classes. This packet transmission priority scheme ensures that voice is transported in the presence of data with a sufficiently low latency so as to ensure speech intelligibility, and overcomes the speech intelligibility issues commonly associated with VOIP, VOATM and VOFR.

DESCRIPTION OF THE PREFERRED EMBODIMENT

Figure 1:
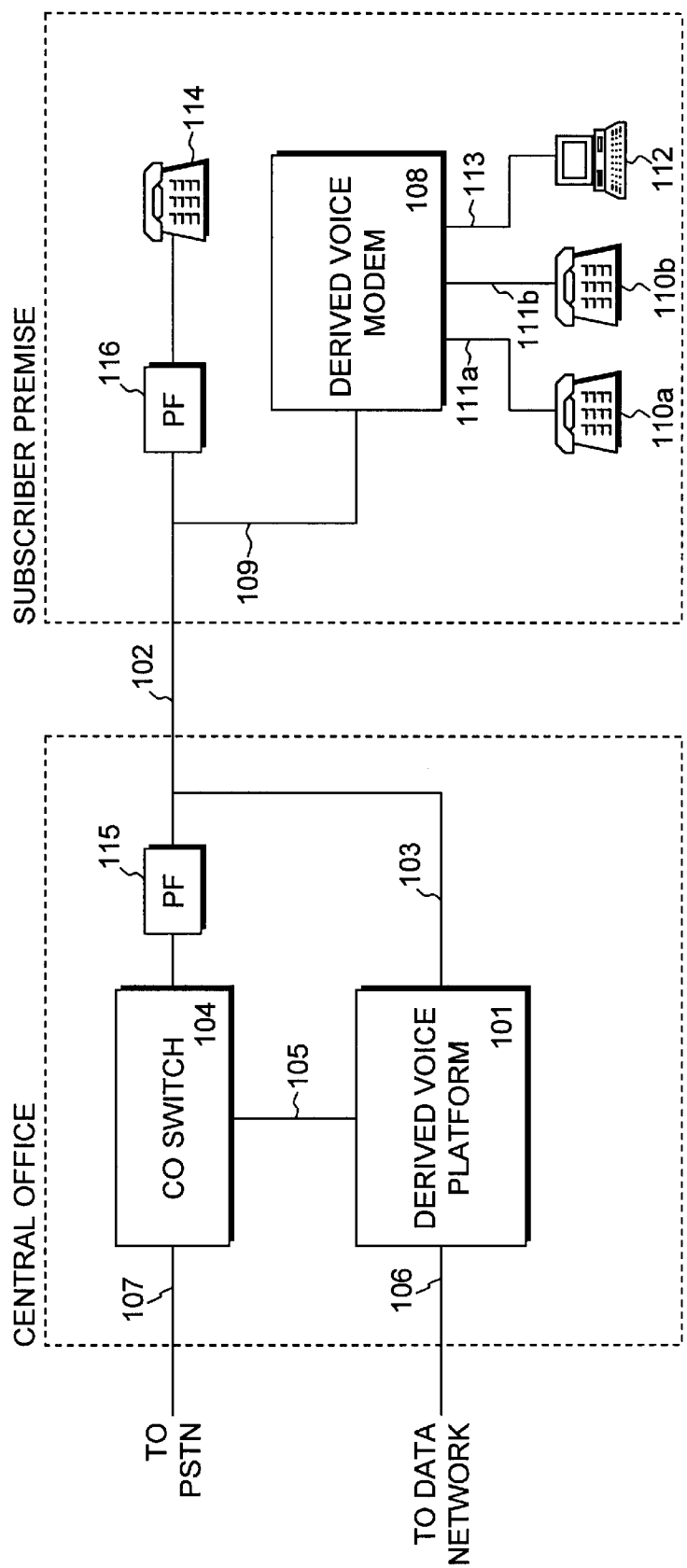
FIG. 1 shows a block diagram of the preferred embodiment of the present invention.

FIG. 1 is a block diagram of the preferred embodiment of the present invention showing, for illustrative purposes, a single subscriber connected to a central office. Typically, multiple subscribers will be connected. At the central office, derived voice platform 101 is connected to subscriber loop 102 over twisted pair connection 103. Derived voice platform 101 is further connected to CO switch 104 over a direct digital PCM trunk connection 105, which uses the North American standard 8-bit uncompressed mu-law commanding PCM technique, and to a data network over connection 106. CO switch 104 is connected to subscriber loop 102 and also to the PSTN over trunk connection 107.

At the customer premise, derived voice modem 108 is connected to subscriber loop 102 over twisted pair connection 109. Telephone instruments 110 are typically standard telephones connected to a voice interface in derived voice modem 108 over standard tip and ring analog voice lines 111, and data device 112 is typically a computer connected to a data interface in derived voice modem 108 over an Ethernet 10BaseT connection 113. For purposes of discussion, it is assumed that there is only one telephone instrument 110 per voice line 111. POTS telephone 114 is also connected to subscriber loop 102.

POTS filters 115 and 116 prevent signals having frequencies above the voice band from interfering with phone service at CO switch 104 and POTS telephone 114.

At the central office, derived voice platform 101 receives PCM format voice data from CO switch 104 over PCM digital trunk 105 and data packets from the data network over 100BaseT connection 106. The PCM voice data is decoded using the 8 kHz network reference timing signal, then packetized, including addressing information in the packet header corresponding to digital trunk timeslot assignment, and the voice and data packets are transmitted over subscriber loop 102 via two-wire connections 103 and 109 to derived voice modem 108 using a digital modulation line code. A timing reference signal synchronized to the network timing reference signal is also transmitted downstream to derived voice modem 108.

The particular digital modulation line code used to transmit the voice packets and Ethernet data packets over subscriber loop 102 between derived platform 101 and derived voice modem 108 is incidental to the invention. Any digital modulation line code that provides the following capabilities may be used: spectral isolation of the carrier frequency band from other services such as POTS on the same physical subscriber loop, sufficient bandwidth to support the desired number of telephone instruments and data devices, power spectral density within applicable FCC rules and regulations, and the ability to transport a network timing reference signal.

To ensure speech intelligibility, derived voice platform 101 gives voice packets a higher transmission priority than data packets over subscriber loop 102. This can be accomplished, for example, by always transmitting queued voice packets and only transmitting data packets if no voice packets are queued to be transmitted.

Derived voice modem 108 receives the voice and data packets over two-wire connection 109. Data packets are transmitted onto Ethernet connection 113 for data device 112. Voice packets are broken back to PCM voice samples, and then converted to voice band analog signals using the timing reference signal as a clock. The voice band analog signals are transmitted to the addressed telephone instrument 110 over connections 111.

In the upstream direction, derived voice modem 108 receives standard tip and ring analog signals from telephone instruments 110 at a voice interface circuit over two-wire connections 111. The tip and ring analog signals are then sampled and PCM encoded at an 8 kHz rate based on the network timing reference signal. These PCM samples are packetized and transmitted over subscriber loop 102 via two-wire connections 109 and 102 to derived voice platform 101 using a digital modulation line code. At the same time, derived voice modem 108 receives Ethernet data packets from data device 112 at an Ethernet interface circuit over connection 113. These Ethernet data packets are segmented, if needed, and transmitted over subscriber loop 102 to derived voice platform 101 using the digital modulation line code.

As in derived voice platform 101, derived voice modem 108 uses a prioritization scheme that gives voice packets a higher transmission priority than data packets over subscriber loop 102.

The PCM sample format voice packets are received by derived voice platform 101 over two-wire connection 103, depacketized and transmitted over digital trunk 105 using the network timing reference signal as a clock. A mapping table associates telephone lines 111 on customer premise modem 108 to digital trunk interface 105 timeslots. Data packets originating from data device 112 are reassembled, if needed, and passed to the data network over Ethernet connection 106.

In a typical implementation, there will also be one or more POTS telephones 114 that share subscriber loop 102 with the present invention. The POTS phones transmit a standard voice band analog signal to CO switch 104. POTS filters 115 and 116 are low-pass filters that keep the higher frequency signals associated with the invention from entering CO switch 104 and POTS telephones 114.

Figure 2:
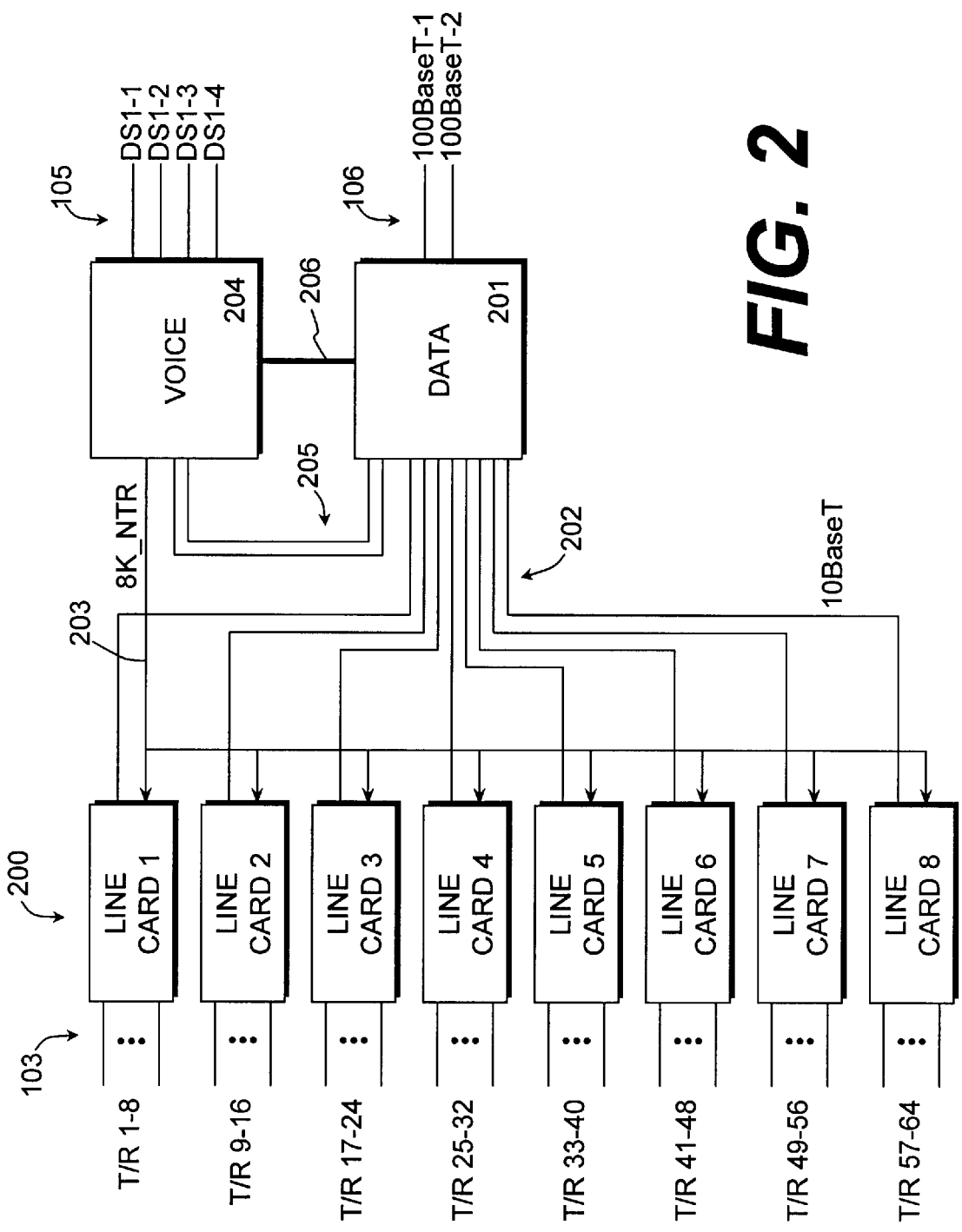
FIG. 2 shows a block diagram of the derived voice platform of the present invention.

FIG. 2 shows a general block diagram of derived voice platform 101 of the preferred embodiment. Voice processor card 204 receives voice data in PCM format over four-DS1 digital trunk connections 105. The PCM voice data is converted to voice packets, which are then encapsulated into Ethernet packets and these Ethernet voice packets are transmitted to data processor card 201 over 10BaseT serial connections 205. Addressing information in the Ethernet header and the voice packet header directs the packet to the telephone instrument 110 associated with the DS1 timeslot. In the upstream direction, voice processor card 204 receives Ethernet voice packets from data processor card 201 over connections 205, buffers the voice data and shifts it out in PCM format in the appropriate timeslot on a DS1 trunk 105.

Voice processor card 204 provides several distinct functions. It extracts the PSTN network timing reference signal and distributes it to line cards 200 over connections 203. It provides the timeslot interchange and DS1 interface circuitry for exchanging voice data in a PCM format with CO switch 104 over DS1 trunks 105. And it has the host CPU that provides the dynamic or static trunk DS0 to line mapping table, and the Ethernet switch management for the Ethernet switches on data processor card 201. The host CPU also performs element manager interface functions such as distributing the software load images for subtending processors, DSPs and programmable logic devices. PCI bus 206 carries the control and provisioning messages of the host CPU to data processor card 201.

Data processor card 201 primarily serves as an Ethernet switch to route Ethernet data packets between the data network over 100BaseT connections 106 and the appropriate line card 200 over a connection 202, and to route Ethernet voice packets between voice processor card 204 over 10BaseT connections 205 and the appropriate line card 200 over a connection 202.

Line cards 200 concentrate twisted pair connections 103 to subscriber loops 102 onto a frame in the central office. Each line card 200 typically supports multiple derived voice modems 108 over multiple tip and ring connections 103. For purposes of illustration, each line card 200 is shown supporting eight derived voice modems 108 over eight tip and ring connections 103.

Line cards 200 provide the CO-side digital line code processing over subscriber loop 102 between derived voice platform 101 and derived voice modems 108 and processing of the voice packets and Ethernet data packets. Ethernet data packets and Ethernet voice packets are received from data processor card 201 over full-duplex 10BaseT Ethernet backplane connections 202. Ethernet data packets are transmitted on the appropriate subscriber loop 102 via a connection 103 using the digital line code. Ethernet voice packets have their Ethernet envelopes removed, and the voice packets are also transmitted on the appropriate subscriber loop 102 via a connection 103 using the digital line code.

In the upstream direction, voice packets and Ethernet data packets are received at line cards 200 in digital line code format from associated derived voice modems 108 over connections 103. Line cards 200 decode the line, encapsulate the voice packets into Ethernet packets, and transmit the Ethernet voice packets and Ethernet data packets to data processor card 201 over Ethernet backplane connections 202.

Network timing reference signal 8K_NTR on connections 203 from voice card 204 acts as a clock signal to line cards 200.

Figure 3:
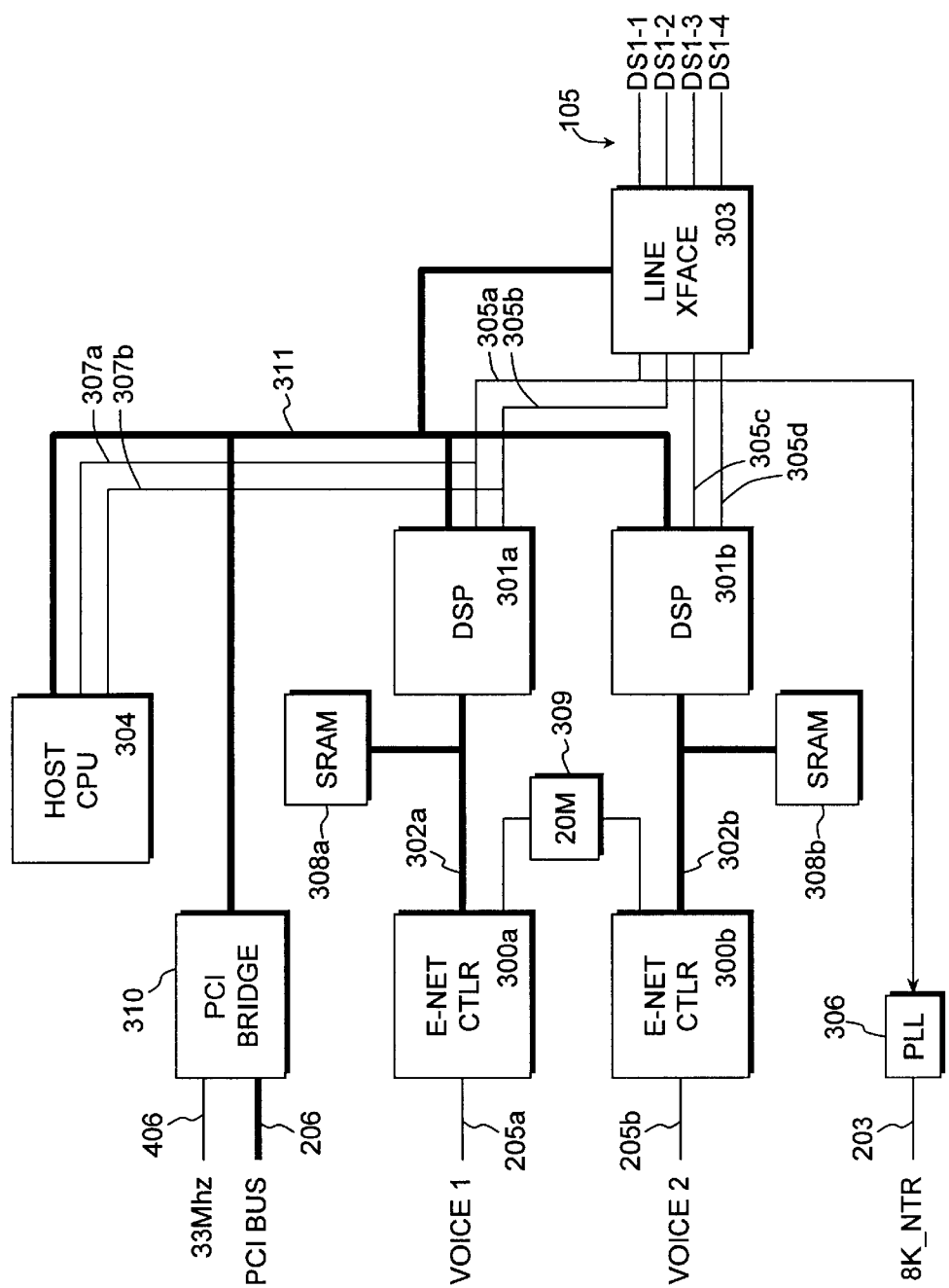
FIG. 3 shows a block diagram of the voice processor card of the derived voice platform of the present invention.

FIG. 3 shows a block diagram of voice processor card 204. In operation, PCM voice data is received by line interface 303 over digital trunk 105 and transmitted to DSPs 301 over serial connections 305. Line interface 303 consists of a four-DS1 line framer, a line interface component that supports four 1.544 Mbps data streams, and a magnetics component. Provisioning of the components of line interface 303 is by host CPU 304 over local processor bus 311 and PCI bus 206. DSPs 301 buffer the PCM voice data and convert it to voice packets on a DS1 timeslot basis and encapsulate each voice packet in an Ethernet envelope. Static random access memories SRAMs 308 are used by DSPs 301 for program code and data storage. DSPs 301 also perform echo cancellation functions. Host CPU 304 manages the mapping tables of DSPs 301 that associate a DS1 timeslot to a line card 200 media access control (MAC) address/derived voice line ID. The Ethernet voice packets are then transmitted to Ethernet controllers 300 over data bus connections 302 for transmission to data processor card 201 over 10BaseT serial connections 205. 20 MHz oscillator 309 provides the system clock signal to Ethernet controllers 300.

In the upstream direction, Ethernet voice packets are received by Ethernet controllers 300 from data processor card 201 over connections 205. The Ethernet voice packets are transmitted to DSPs 301 over data bus connections 302. DSPs 301 remove the Ethernet envelope from the voice packets, depacketize the voice packets, buffer the PCM voice data and transmit the PCM data through line interface 303 onto the DSls of digital trunk 105. DSPs 301 provide the DS1 voice timeslot interchange function as directed by host CPU 304.

In the preferred embodiment, each Ethernet controller 300 is a Cirrus Logic Inc. model CS8900 Ethernet Controller, and each DSP 301 is a Texas Instrument Inc. model TMS320C6201 Digital Signal Processor. DSPs 301 are connected to DS1 line interface 303 over serial connections 305 through two Multi-Channel Buffered Serial Ports (McBSPs) on each DSP 301. In the preferred embodiment, each of the two McBSPs on each DSP 301 is associated with one of the four DSls of trunk 105. Numerous makes and models of discrete and integrated line interfaces are commercially available.

In the preferred embodiment, digital trunk 105 is a four-DS1 interface using the GR-303 signaling protocol as described in standards publication GR303 , "Integrated Digital Loop Carrier System Generic Requirements, Objectives, and Interface," Issue 2, December 1998, Telcordia Technologies, Inc. Although the transmission protocol of trunk 105 into the CO switch is shown as a GR-303 DS1 trunk connection, any suitable protocol and physical connection that allows for a direct digital tie-in to the switching fabric can be used. For example, the TR-008 protocol, as described in standards publication TR-TSY-000008, "Digital Interface Between the SLC-96® Digital Loop Carrier System and a Local Digital Switch," Issue 2, Rev. 1, Bul. 1, Oct 1994, Telcordia Technologies, Inc, may also be used.

Host CPU 304 manages the GR-303 protocol through active and standby Embedded Operations Channels (EOCs) and Timeslot Management Channels (TMCs). Connection 307a communicating with DS1-1 of trunk 105 over connection 305a carries the active EOC and TMC channels, while connection 307b communicating with DS1-2 of trunk 105 over connection 305b carries the standby EOC and TMC channels. In the preferred embodiment, each connection 307 connects to a TDM port on host 304 that is programmed to extract the EOC and TMC messaging channel and pass it to a SCC where the messages are extracted and presented to the host CPU processor 304. Host CPU 304 then makes the proper DS1 timeslot mapping by programming the line card 200 addressing and the voice timeslot interchange mapping tables on DSPs 301 through messages over PCI bus 206 and local processor bus 311.

Host CPU 304 also performs the host CPU element manager functions for derived voice platform 101. Those skilled in the art will understand these functions to include provisioning, data collection, and software download. A local craft interface to the host CPU (not shown) is typically part of the system. In the preferred embodiment, host CPU 304 is a Motorola model MPC860EN. Element manager messaging is in-band across PCI bus 206 for data processor card 201 and across PCI bus 206 and local processor bus 311 for voice processor card 204, and through Ethernet packets across backplane 202 for line cards 200. PCI bridge 310 allows for connection of host CPU 304 to PCI bus 206 over local processor bus 311. Depending on component choice, PCI bridge 310 may not be needed. The 33 MHz timing signal on connection 406 from data processor card 201 provides a clock to PCI bridge 310.

As illustrated, line interface 303 extracts the timing signal used to generate 8 kHz network timing reference signal 8K_NTR used by line cards 200. The raw timing signal is extracted from DS1-1 of trunk 105 of connection 305*a* by line interface 303 and transmitted to phase-lock loop circuit 306 over connection 305*a*, where it is divided down and sent as a stable 8 kHz network timing reference signal 8K_NTR over connection 203 to line cards 200. For backup capability in the event that DS1-1 fails, line interface 303 can also be programmed to extract the raw timing signal from, for example, DS1-3 and transmit this signal to a software selectable 2:1 multiplexer that also receives the raw timing signal from line interface 303 DS1-1 and outputs one of these signals to PLL 306.

Figure 4:
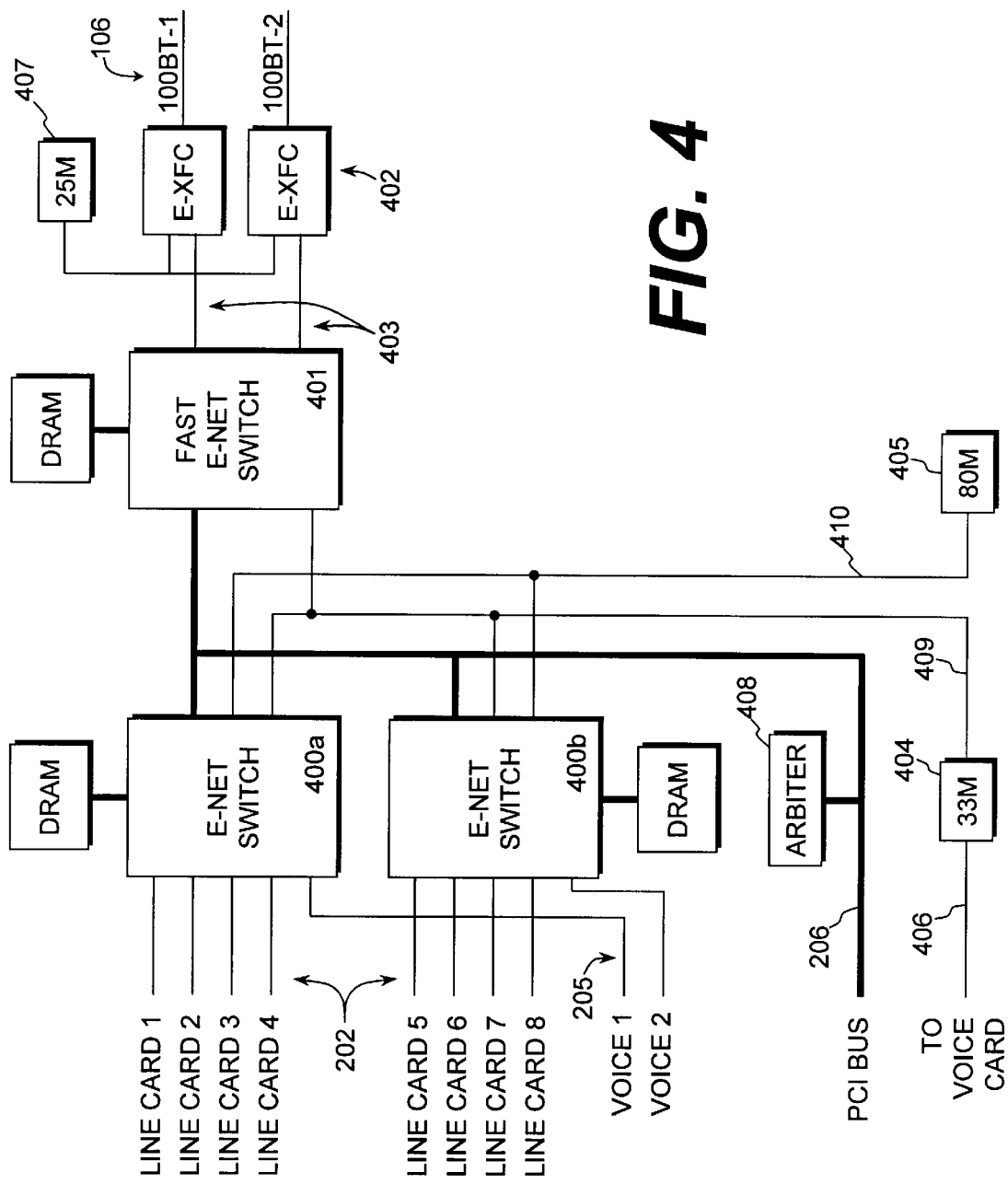
FIG. 4 shows a block diagram of the data processor card of the derived voice platform of the present invention.

FIG. 4 shows a block diagram of data processor card 201. Data processor card 201 receives Ethernet data packets from the data network over 100BaseT connections 106 at Ethernet physical interfaces 402. The Ethernet data packets are then transmitted to fast Ethernet switch 401 over connections 403. Fast Ethernet switch 401 then routes the Ethernet data packets to Ethernet switches 400 over PCI bus 206 where they are then routed to the appropriate line card 200 over a 10BaseT backplane connection 202.

Ethernet voice packets are received from voice processor card 204 over 10BaseT connections 205 at Ethernet switches 400. The Ethernet voice packets are then routed to the appropriate line card 200 over a connection 202.

In the upstream direction, line cards 200 transmit voice and data Ethernet packets to Ethernet switches 400 over backplane connections 202. Ethernet data packets are routed to fast Ethernet switch 401 over PCI bus 206, where they are then sent to 100BaseT physical interfaces 402 over connections 403 for transmission to the data network over 100BaseT connections 106. Ethernet voice packets received from line cards 200 are routed by Ethernet switches 400 to voice processor card 204 over 10BaseT connections 205.

The Ethernet routing tables for Ethernet switches 400 and 401 are maintained by host CPU 304 over PCI bus 206.

33 MHz oscillator 404 provides timing to Ethernet switches 400 and 401 over connection 409 for PCI bus 206 circuitry, and 80 MHz oscillator 405 provides timing to Ethernet switches 400 over connection 410 for transmit and receive timing. 33 MHz oscillator 404 also provides a timing signal to voice processor card 204 over connection 406. 25 MHz oscillator 407 provides timing to 100BaseT physical interfaces 402 for their transmit and receive clocks.

Bus arbiter 408 controls ownership of the bus using a simple rotating priority algorithm among PCI resources that can control the bus. In the present invention, bus arbiter 408 is implemented in a programmable logic device. Depending on component selection, a separate bus arbiter 408 may not be required.

In the preferred embodiment, each Ethernet switch 400 is a Galileo Technology Inc. model GT-48001A Switched Ethernet Controller, fast Ethernet switch 401 is a Galileo Technology Inc. model GT-48002A Switched Fast Ethernet Controller, and each 100BaseT physical interface 402 is a Level One Communications Inc. models LXT970 Dual-Speed Fast Ethernet Transceiver.

Figure 5:
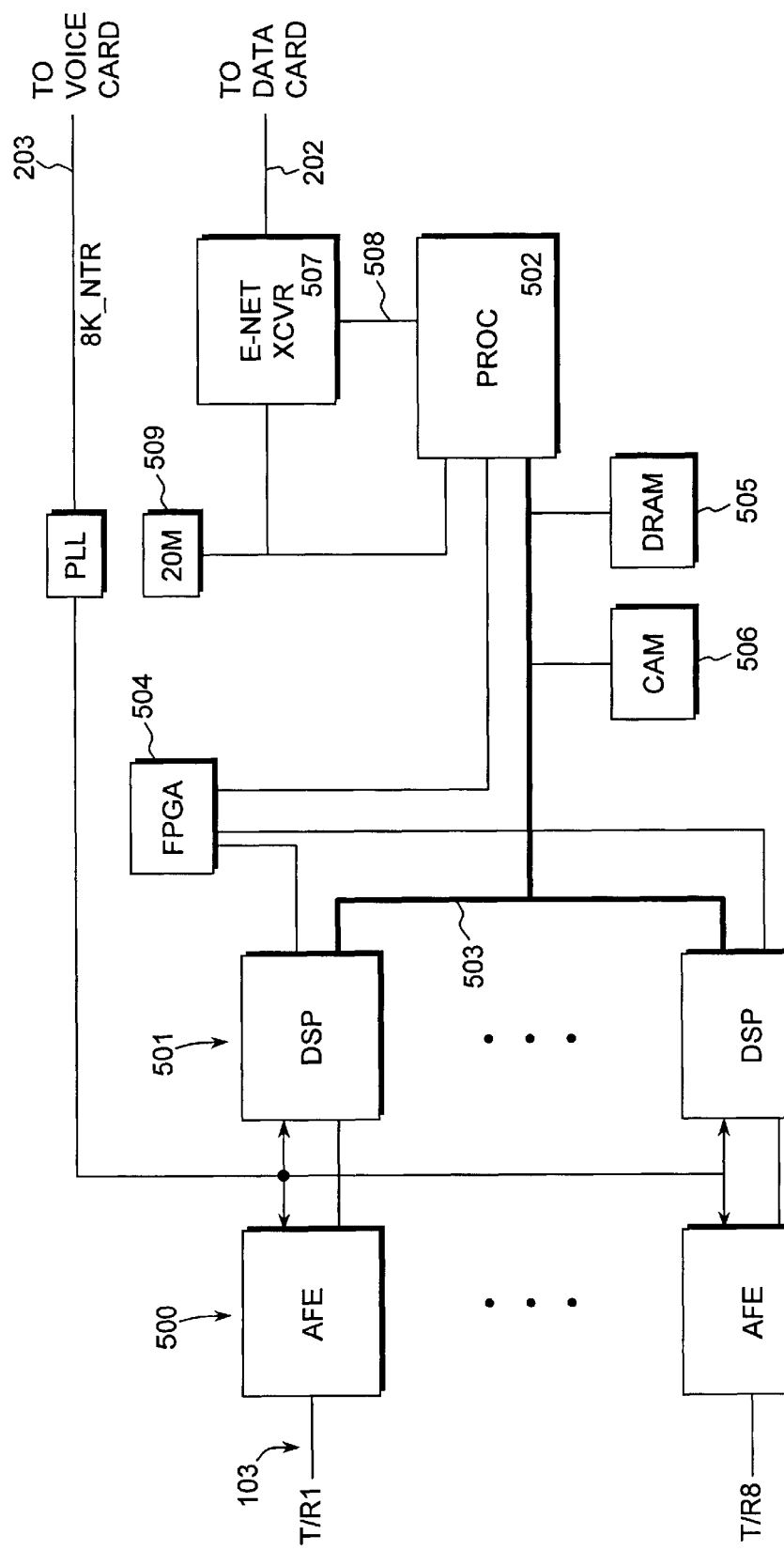
FIG. 5 shows a block diagram of the line card of the derived voice platform of the present invention.

FIG. 5 shows a block diagram of a line card 200. Ethernet transceiver 507 receives Ethernet voice and data packets from data processor card 201 over 10BaseT backplane connection 202. The Ethernet voice and data packets are then transmitted to processor 502 over connection 508. 20 MHz oscillator 509 provides a timing signal to Ethernet transceiver 507 and processor 502. Dynamic random access memory DRAM 505 and content-addressable memory CAM 506 are used by processor 502 for program and data storage and packet buffering, and for fast lookup of MAC/IP addresses, respectively. Other suitable forms of memory may also be used. Processor 502 removes the Ethernet envelope from the voice packets, segments large Ethernet data packets, and transmits the voice and Ethernet data packets to DSPs 501 over bus connection 503.

DSPs 501 are connected to processor 502 over Host Processor Interface (HPI) bus 503. HPI bus 503 comprises an address and data bus, an interrupt connection for each DSP 501 and various control input signals. A field programmable gate array FPGA 504 acts as a control signal interface between processor 502 and DSPs 501. Although the control signals passed between processor 502 and DSPs 501 are relatively standardized, there generally are differences among manufacturers in the timing and composition of the control output signals and expected control input signals. FPGA 504 formats control output signals to meet the specific requirements of the expected control input signals. Those skilled in the art will recognize the well known function of FPGA 504 by its more common name "glue logic." Depending on component choices, a glue logic FPGA may not be needed.

DSPs 501 convert the voice packets and Ethernet data packets to the digital line code and transmit the line code data to analog front ends AFEs 500 for transmission across subscriber loops 102 via connections 103. 8 kHz network timing reference signal 8K_NTR on lead 203 from voice processor card 204 provides timing to AFEs 500 and DSPs 501.

In the upstream direction, line code format voice and Ethernet data packets are received at AFEs 500 over subscriber loop connections 103. AFEs 500 convert the analog line code data to a digital format serial bit stream, and transmit the bit stream to a buffered serial port of an associated DSP 501. DSPs 501 decode the line and transmit the voice packets and segmented Ethernet data packets to processor 502. The voice packets are encapsulated in Ethernet frames and the segmented Ethernet data packets are reassembled. Both the Ethernet voice packets and Ethernet data packets are then transmitted from processor 502 to Ethernet transceiver 507 over connection 508. In the present invention, each line card is assigned a MAC layer address to facilitate switching on data processor card 201, and mapping of derived voice lines to appropriate time slots on PCM trunk 105. Ethernet transceiver 507 then transmits all Ethernet voice and data packets to data processor card 201 over 10BaseT Ethernet backplane connection 202.

In the present invention, each active (off-hook) derived voice modem telephone line 110 requires a dedicated 192 kbps of bandwidth over a subscriber line 102, comprising 64 kbps upstream, 64 kbps downstream, and 64 kbps for signaling and control overhead. A derived voice modem data line 113 is not constrained by a constant bit rate transmission stream, and can use the remainder of the available subscriber loop bandwidth not allocated to active derived voice telephone lines for Ethernet data packet transmission.

In the preferred embodiment, the particular digital modulation line code technology used to transmit the voice packets and Ethernet data packets over subscriber loop 102 between derived platform 101 and derived voice modem 108 is Tripleplay from Paradyne Corporation. Tripleplay is a trademark of Paradyne Corporation. Tripleplay uses a frequency spectrum within the ISDN envelope, but reserves the lower frequencies down to 0 Hz exclusively for POTS transmission. Tripleplay generates and transmits a timing reference signal over subscriber loops 102 between DSPs 501 on derived voice platform 101 and associated DSPs on derived voice modems 108. The Tripleplay timing reference signal is phase locked to the network timing reference signal 8K_NTR delivered to DSPs 501 over connections 203. In the illustrations of the invention, no distinction is made of the Tripleplay timing reference signal, and network timing reference signal 8K_NTR is shown in uninterrupted fashion from derived voice platform 101 to derived voice modems 108.

In the preferred embodiment, Ethernet transceiver 507 is a Motorola MC68160 Enhanced Ethernet Serial Transceiver, Processor 502 is a Motorola model MPC860EN PowerQUICC microprocessor, each DSP 501 is a Texas Instrument model TMS320VC549 Digital Signal Processor supporting the Tripleplay line coding algorithms through software supplied by Paradyne, and each AFE 500 is a BurrBrown model AFE1137 Analog Front End tuned to support the Tripleplay digital line code.

Figure 6:
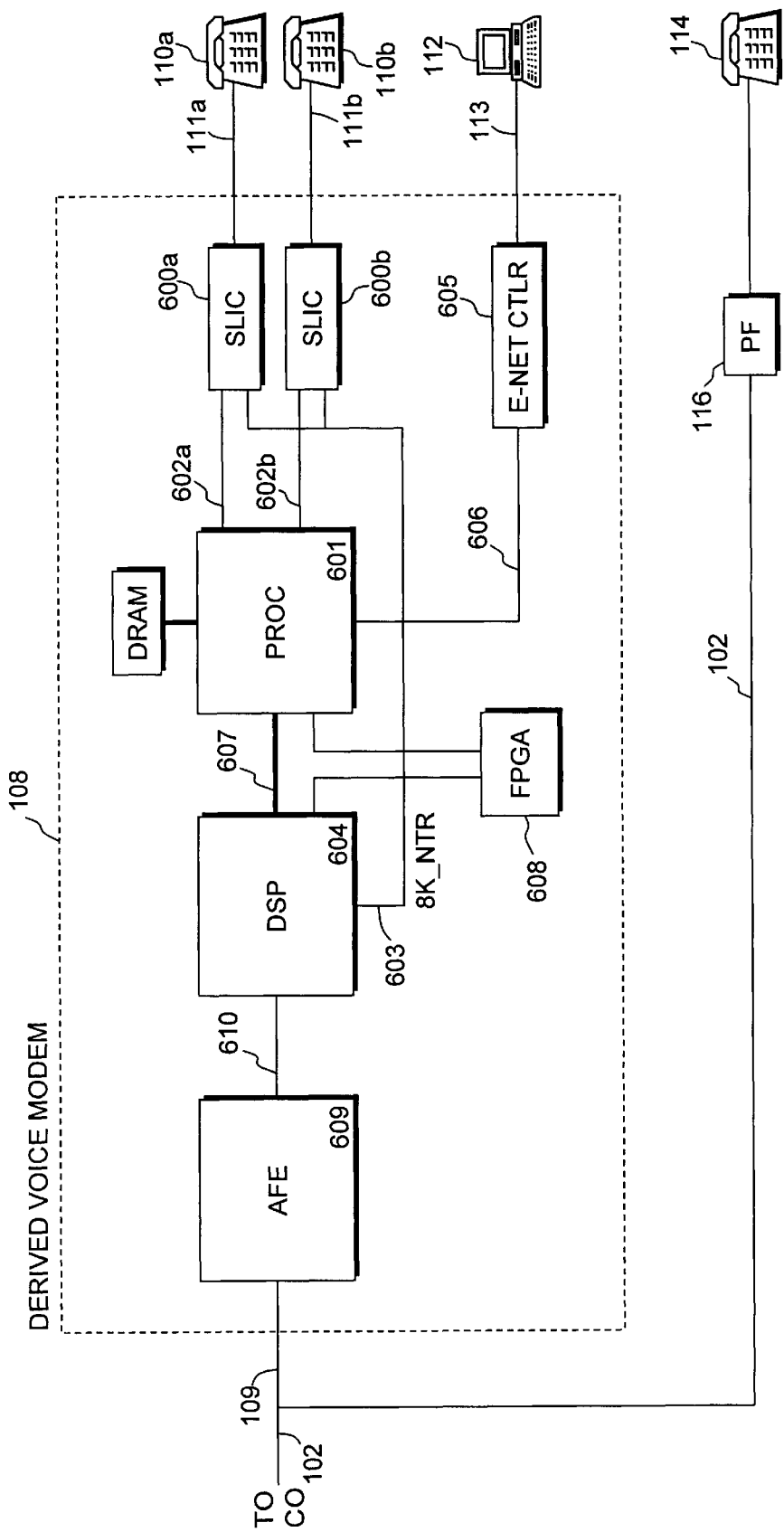
FIG. 6 shows a block diagram of the derived voice modem of the present invention.

FIG. 6 shows a block diagram of derived voice modem 108 of the present invention. Telephone instruments 110 are connected to Subscriber Line Interface Circuits (SLICs) 600 over two-wire connections 111. SLICs 600 receive the tip and ring analog signals from telephones 110, sample the analog signals and digitally encode the signals using the PCM technique, and transmit the voice samples to processor 601 over connections 602. The sampling rate is clocked by the 8 kHz network timing reference signal 8K_NTR, as delivered to SLICs 600 over connection 603 by DSP 604. The sampling information is transmitted from SLICs 600 in a 64 kbps serial bit stream, comprising 8K samples at 8 bits per sample, to full-duplex Serial Communication Channel interfaces (SCCs) on processor 601 over connections 602.

Processor 601 packetizes the PCM voice samples into voice packets that include signaling information and a header. Since these packets are transmitted locally and not onto the network, any suitable packet format may be used, including standard and non-standard or proprietary formats. In the preferred embodiment, a proprietary voice packet format is used where the format and packet length were optimized for the line code and line technology. The voice packet format is comprised of an on/off-hook, ringing, and disconnect signaling word, and 128 bytes of PCM. This voice packet is further encapsulated in a "line" packet which contains further addressing, control, and error protection bytes. Total packet length is 140 bytes.

Concurrently, data device 112 is transmitting Ethernet data packets to Ethernet controller 605 over 10BaseT connection 113. These data packets are then transmitted to processor 601 over connection 606. Processor 601 segments the Ethernet packets to a size comparable to that of the voice packets if necessary.

The voice and Ethernet data packets are then buffered in processor 601 and transmitted over bus 607 to a HPI in DSP 604. FPGA 608 provides glue logic between processor 601 and DSP 604. Depending on component choices, FPGA 608 may not be needed. DSP 604 then formats the voice packets and Ethernet data packets into a serial bit stream, performs line encoding and modulation, and transmits the bit stream to AFE 609 over connection 610. AFE 609 then drives the bits onto subscriber loop 102 via connection 109 using the digital modulation line code.

To ensure high quality voice in a mixed voice and data packet transmission scheme, voice packets are given transmission priority in processor 601 such that an effective constant 64 kbps upstream and downstream rate is maintained. This is accomplished by a combination of relatively small and comparable voice and data packet sizes and always giving voice packets priority over data packets.

Operation in the downstream direction is essentially the reverse process of the upstream direction as just described. Prioritization of voice packets over data packets has taken place at the CO side, allowing downstream packets to be processed in the order received.

In the preferred embodiment, derived voice modem 108 is a SuperLine Integrated Access Device, part number TR100890-2C, available through AG Communication Systems Corp. SuperLine is a trademark of AG Communication Systems Corp. The SuperLine Adapter is based on the Tripleplay technology from Paradyne Corporation.

Also shown in FIG. 6 is POTS telephone 114 connecting to subscriber loop 102. Standard POTS service shares subscriber loop 102 with the derived voice lines of the present invention. In the preferred embodiment, a low-pass filter 116 isolates POTS telephone 114 from the higher frequency signals of the derived voice lines.

Other Embodiments

While an enabling disclosure of the preferred embodiment of the present invention has been particularly described, other embodiments of the invention are within the scope of the following claims. It is intended that the scope of the invention be defined by the claims below and their equivalents.

Embodiments involving scaling of the invention to meet physical, technological or economic constraints or customer requirements can be made without departing from the scope and spirit of the invention. For example, the number of telephone instruments and data devices that can be supported by a derived voice modem 108 is governed by the total bandwidth available for transport over connection 109 and subscriber loop 102, the bandwidth that is incrementally dedicated to each active telephone instrument 110, and the minimum acceptable bandwidth to be used for data transport. In turn, these bandwidth parameters are governed by the chosen transport technology and associated protocols, and subscriber loop conditions. In general, the number of derived voice telephone instruments 110 and computing devices 112 supported by a derived voice modem 108, the number of derived voice modems 108 supported by a derived voice platform 101, the number of line cards 200 per derived voice platform 101, and the number of subscriber loops 103 per line card 200 are design decisions governed by the above factors and can cover a wide range within the scope of the invention.

Figure 7:
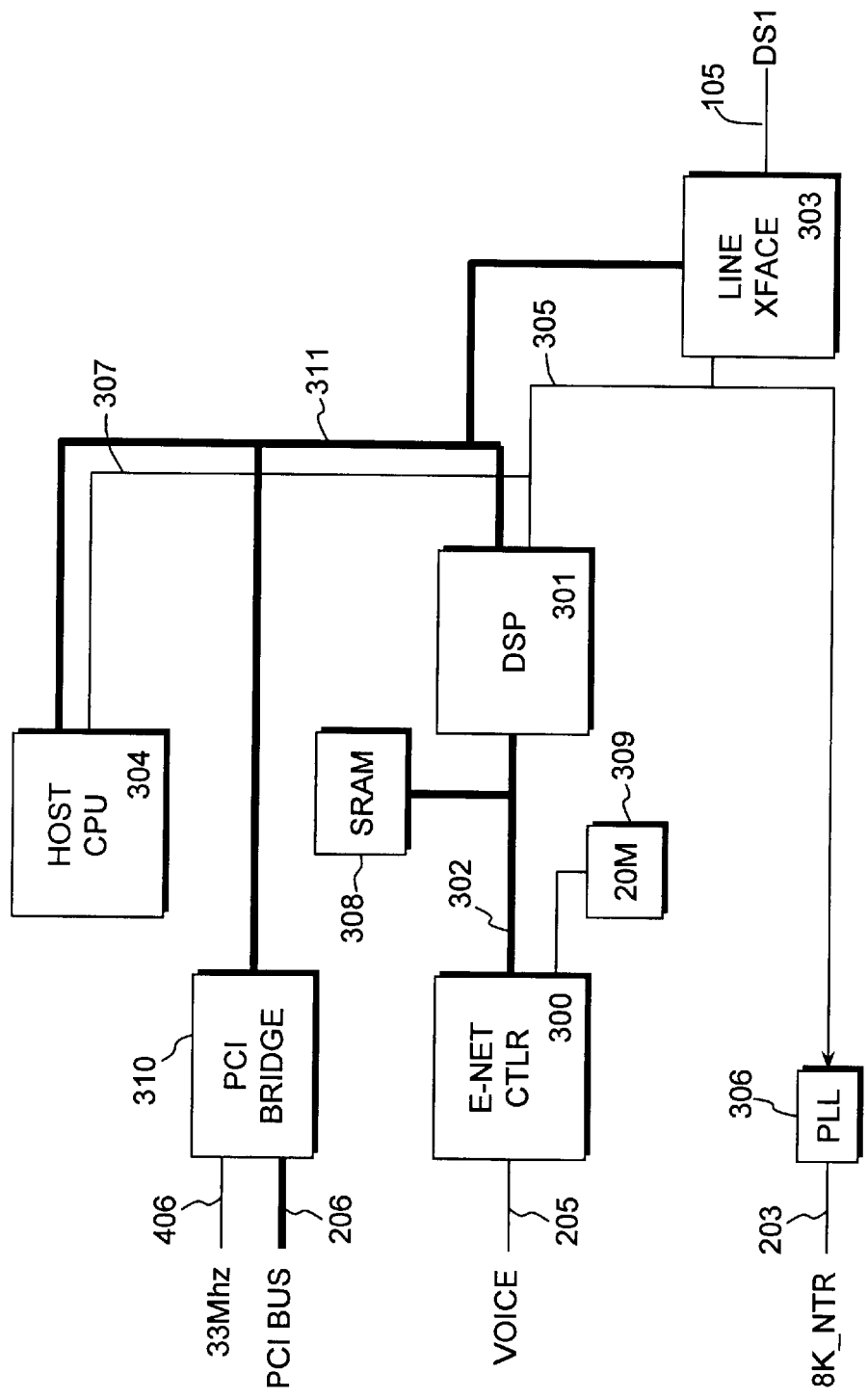
FIG. 7 shows a second embodiment of a block diagram of the voice processor card of the derived voice platform of the present invention.
Figure 8:
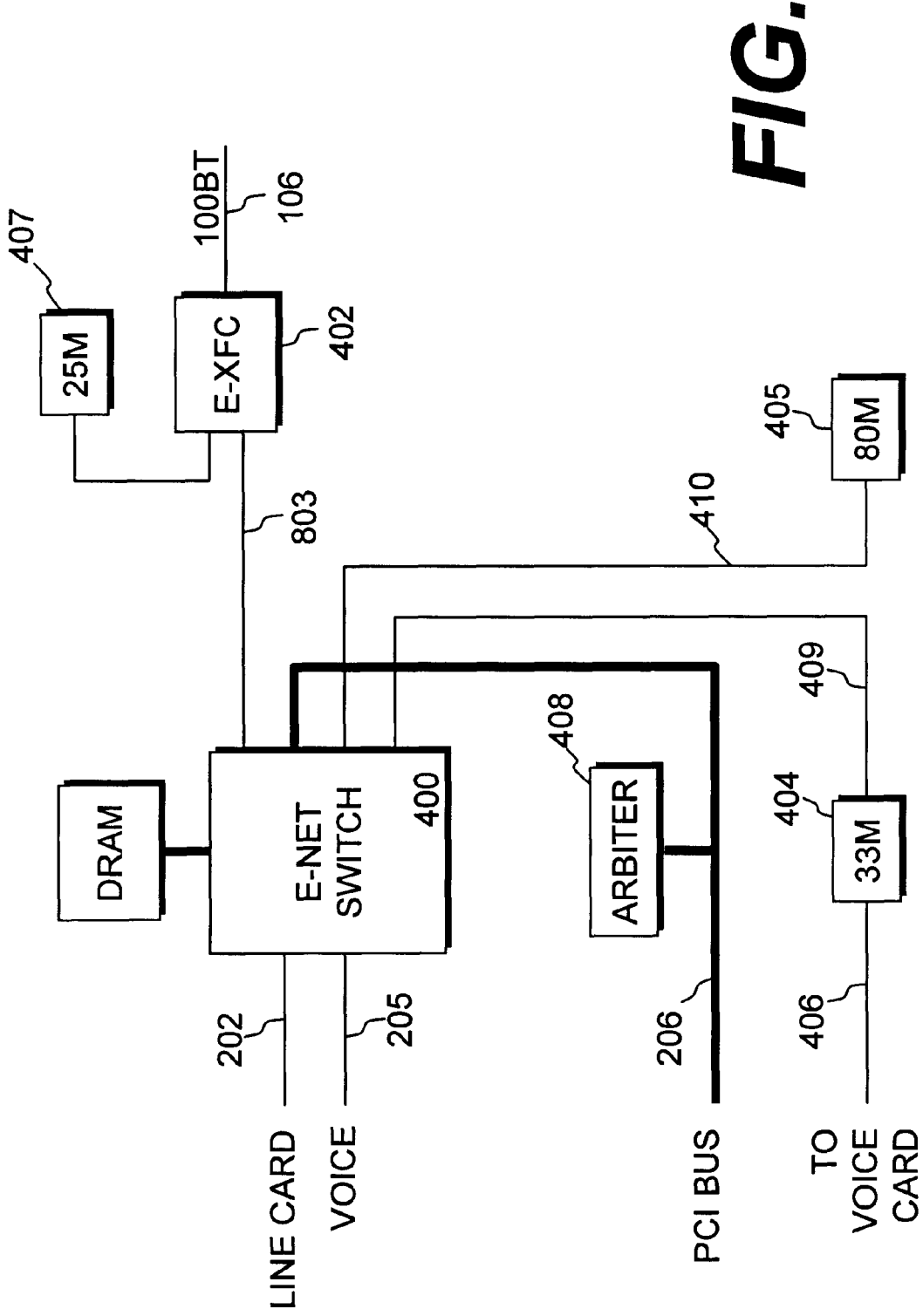
FIG. 8 shows a second embodiment of a block diagram of the data processor card of the derived voice platform of the present invention.

At the other end of the scale, FIGS. 7 and 8 show how the voice and data cards, respectively, may be configured in support of a single telephone instrument and data device on a single subscriber loop. The components of FIGS. 7 and 8 perform the same basic functions as described above for the general case of multiple data devices and telephone instruments. For a single telephone instrument with no data device, data processor card 201 isn't needed, and Ethernet controller 300 can connect directly to Ethernet transceiver 507. In addition, analog front ends 500 and digital signal processors 501 serving subscriber loops 103 two through eight would not be needed.

As additional subscriber loops 103 are served, corresponding analog front ends 500 and digital signal processors 501 will be required. As additional line cards are served, additional Ethernet switches 400 may be required as load dictates.

Similarly, embodiments involving specific component choices to meet physical, technological or economic constraints can be made without departing from the scope and spirit of the invention. For example, a suite of components from a single manufacturer may not require the glue logic that is indicated in the preferred embodiment of the present invention. Also, certain component choices may be more or less integrated than other choices, or have larger or smaller capacities. These component choices are design decisions governed by the above factors and can cover a wide range within the scope of the invention.

The particular digital modulation line code used to transmit the voice and data packets over the subscriber loop between is incidental to the invention. Any digital modulation line code that provides the following capabilities may be used: spectral isolation of the carrier frequency band from other services such as POTS on the same physical subscriber loop, sufficient bandwidth to support the desired number of telephone instruments and data devices, power spectral density within applicable FCC rules and regulations, and the ability to transport a network timing reference signal. For example, another acceptable digital modulation line code is G.lite as standardized by the International Telecommunications Union.

Similarly, the transmission protocol and connection 106 into the data network, shown as a 100BaseT connection, may be any suitable protocol and physical connection that satisfies the specific requirements of the application.

In the preferred embodiment, backplane 202 uses the Ethernet protocol to transport the voice and data packets between line cards 200, data processor card 201 and voice processor card 204. However, other cell or frame oriented protocol can be used. For example, ATM25 with an ATM switch may also be used.

The preferred embodiment describes a system where derived voice platform 101 connects directly to a CO switch 104 over a trunk 105, and directly to a data network over a connection 106. Those skilled in the art will appreciate that a telecommunications network may involve numerous network elements, and with interface-related changes within the scope of the invention, derived voice platform 101 may reside at any of multiple points in the network.

The voice and data packet sizes are design decisions dependent on the underlying protocols and transmission technologies chosen, balanced against the requirement to minimize latency in the delivery of voice transmission. Different technologies may yield different absolute and relative voice and data packet sizes.

The invention of Applicants may also be implemented in a phased approach wherein additional voice line services are offered initially, and data services are offered when a data transport infrastructure at the central office is established.

What is claimed is:

1. A system for multiple derived voice lines over a subscriber loop for use in a telephone network, said system comprising:

a voice interface adapted to connect to the telephone network over a digital network connection, and operable to receive over said digital network connection digitized voice data, and further operable to packetize said digitized voice data into voice packets; and a line interface adapted to connect to a subscriber loop having an active telephone instrument connected thereto, and operable to receive said voice packets from said voice interface and transmit said voice packets to the active telephone instrument via the subscriber loop;

wherein:

the telephone network includes a source of a network timing reference signal;

said voice interface is further operable to receive a first timing signal over said digital network connection that is synchronized to the network timing reference signal, and to receive said digitized voice data in synchronization with said first timing signal, and further operable to generate and transmit to said line interface a second timing signal that is synchronized to said first timing signal; and said line interface is further operable to generate and transmit onto the subscriber loop a third timing signal that is synchronized to said second timing signal.

2. A system according to claim 1, wherein said digitized voice data is received over said digital network connection in accordance with a GR-303 transmission protocol.

3. A system according to claim 1, wherein said digitized voice data is received over said digital network connection in accordance with a TR-008 transmission protocol.

4. A system according to claim 1, wherein said line interface is further operable to transmit said voice packets onto the subscriber loop in accordance with a digital modulation line code that provides spectral isolation of a carrier frequency band from other frequency bands on the subscriber loop.

5. A system according to claim 4, wherein said digital modulation line code uses a frequency spectrum that is within the frequency spectrum of ISDN.

6. A system according to claim 1, wherein said voice packets are encoded in accordance with an Ethernet protocol.

7. A system according to claim 1, wherein said voice interface is further operable to receive digitized voice data associated with one or more active telephone instruments, each of the active telephone instruments associated with a unique address, and each of said voice packets further comprising the unique address of one of the active telephone instruments.

8. A system according to claim 1, wherein:

said voice interface is further operable to receive digitized voice data associated with one or more active telephone instruments, each of the active telephone instruments associated with a unique address, each of said voice packets further comprising the unique address of one of the active telephone instruments; and said line interface is further adapted to connect to one or more subscriber loops each having one or more of the active telephone instruments connected thereto, and further operable to transmit each of said voice packets toward the active telephone instruments over the subscriber loops.

9. A system according to claim 1, wherein:

said voice interface is further operable to receive digitized voice data associated with one or more active telephone instruments, each of the active telephone instruments associated with a unique address, each of said voice packets further comprising the unique address of one of the active telephone instruments;

said system further comprises one or more of said line interfaces, each being further adapted to connect to one or more subscriber loops, each of the subscriber loops having one or more of the active telephone instruments connected thereto, each of the line interfaces associated with the active telephone instrument addresses of the active telephone instruments connected thereto, and the line interfaces further operable to transmit received packets toward the active telephone instruments over the subscriber loops; and said system further comprises a packet switch interposed between said voice interface and said line interfaces, said packet switch operable to receive said voice packets from said voice interface and to route each of said voice packets to the line interface associated with the active telephone instrument address in said voice packet.

10. A system for multiple derived voice lines over a subscriber loop for use in a telephone network, said system comprising:

a line interface adapted to connect to a subscriber loop having an active telephone instrument connected thereto, and operable to receive over the subscriber loop voice packets comprising digitized voice data from the active telephone instrument; and a voice interface adapted to connect to the telephone network over a digital network connection, and operable to receive said voice packets from said line interface, to extract said digitized voice data, and to transmit said digitized voice data over said digital network connection; wherein:

the telephone network includes a source of a network timing reference signal;

said voice interface is further operable to receive a first timing signal over said digital network connection that is synchronized to the network timing reference signal, and to transmit said digitized voice data in synchronization with said first timing signal, and further operable to generate and transmit to said line interface a second timing signal that is synchronized to said first timing signal; and said line interface is further operable to generate and transmit onto the subscriber loop a third timing signal that is synchronized to said second timing signal, said digitized voice data digitized in synchronization with said third timing signal.

11. A system according to claim 10, wherein said digitized voice data is transmitted over said digital network connection in accordance with a GR-303 transmission protocol.

12. A system according to claim 10, wherein said digitized voice data is transmitted over said digital network connection in accordance with a TR-008 transmission protocol.

13. A system according to claim 10, wherein said line interface is further operable to receive said voice packets over the subscriber loop in accordance with a digital modulation line code that provides spectral isolation of a carrier frequency band from other frequency bands on the subscriber loop.

14. A system according to claim 13, wherein said digital modulation line code uses a frequency spectrum that is within the frequency spectrum of ISDN.

15. A system according to claim 10, wherein said voice packets are encoded in accordance with an Ethernet protocol.

16. A system according to claim 10, wherein said line interface is further adapted to connect to a subscriber loop having one or more active telephone instruments connected thereto, each of the active telephone instruments associated with a unique address, and each of said voice packets further comprising the unique address of one of the active telephone instruments.

17. A system according to claim 10, wherein said line interface is further adapted to connect to one or more subscriber loops each having one or more active telephone instruments connected thereto, each of the active telephone instruments associated with a unique address, and each of said voice packets further comprising the unique address of one of the active telephone instruments.

18. A system according to claim 10, wherein:

said system further comprises one or more of said line interfaces, each of the line interfaces further adapted to connect to one or more subscriber loops each having one or more active telephone instrument connected thereto, each of the active telephone instruments associated with a unique address, each of said voice packets further comprising the unique address of one of the active telephone instruments;

said system further comprises a packet switch interposed between said line interfaces and said voice interface, said packet switch operable to receive said voice packets from said line interfaces and to route said voice packets to said voice interface; and said voice interface is further operable to receive said voice packets from said packet switch.

* * * * *